United States Patent

Gregor et al.

Patent Number: 5,841,218
Date of Patent: Nov. 24, 1998

[54] LASER HEAD HAVING A CONDUCTIVELY COOLED FLASHLAMP

[75] Inventors: Eduard Gregor, Pacific Palisades; Tzeng S. Chen, Rancho Palos Verdes; Mario P. Palombo, Manhattan Beach; James S. Sorce, Torrance, all of Calif.

[73] Assignee: Hughes Electronics, Los Angeles, Calif.

[21] Appl. No.: 603,670

[22] Filed: Feb. 20, 1996

[51] Int. Cl.[6] ................................ H01J 1/02; H01J 7/24; H01K 1/58

[52] U.S. Cl. .................. 313/46; 165/104.33; 362/373; 372/72

[58] Field of Search .................. 313/46; 165/104.33; 362/373; 372/72

[56] References Cited

U.S. PATENT DOCUMENTS

| | | | |
|---|---|---|---|
| 4,176,324 | 11/1979 | Aldag et al. | 331/94.5 T |
| 4,292,601 | 9/1981 | Aldag et al. | 331/94.5 L |
| 4,637,028 | 1/1987 | Kahan | 372/34 |

*Primary Examiner*—Sandra L. O'Shea
*Assistant Examiner*—Joseph Williams
*Attorney, Agent, or Firm*—Gordon R. Lindeen, III; Michael W. Sales; Wanda K. Denson-Low

[57] ABSTRACT

A conductively cooled flashlamp (30) for use solid state lasers. The flashlamp (30) has an elongated heat sink (31) with a reflective center channel (32), and a flashlamp tube (12) disposed in the channel (32) that extends beyond the ends of the channel (32). Heat conducting gaskets (37a, 37b) are disposed around respective ends of the envelope (34) that separate the tube (12) from the heat sink (31) to provide an air gap (35) therebetween. Clamps (36a, 36b) contact the gaskets (37a, 37b) and secure the envelope (34) to the heat sink (31). Electrodes (25a, 25b) of the tube (12) extend away from the ends of the tube (12) and heavy wires (38a, 38b) are connected to the electrodes (25a, 25b) and extend longitudinally away from the respective electrodes (25a, 25b). Heat conducting, electrically insulating heat sink members (41a, 41b) are disposed at opposite distal ends of the heat sink (31), and wire clamps (42a, 42b) secure the wires 38a, 38b to the heat sink members (41a, 41b). Thus, the tube (12) is disposed in close proximity to the reflective heat sink (31), which does not directly contact the tube (12). The tube (12) is clamped with good thermal contact to the heat sink near the electrodes where most of the heat is generated using indium gaskets (37a, 37b). The wires 38a, 38b that connect to the tube (12) are connected to the heat sink (31) with thermally conductive and electrically insulating material, such as beryllium oxide.

20 Claims, 1 Drawing Sheet

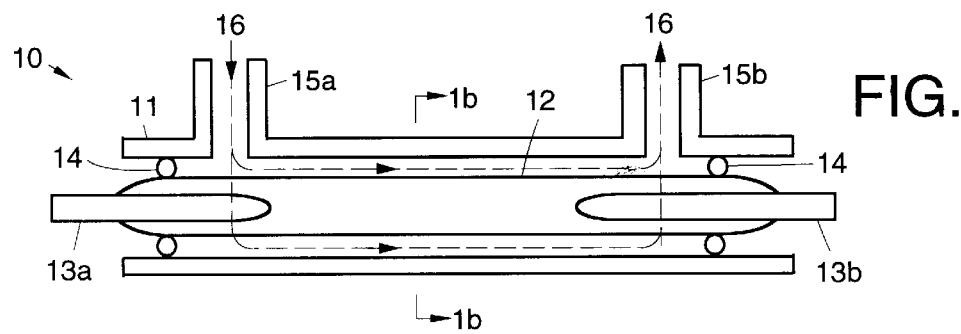
FIG. 1a.
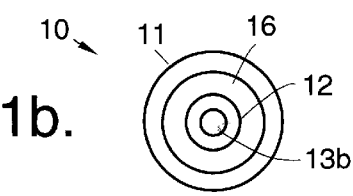
FIG. 1b.
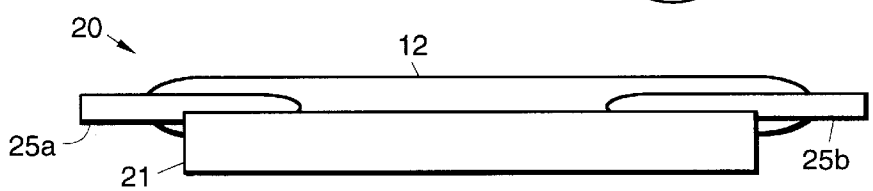
FIG. 2a.
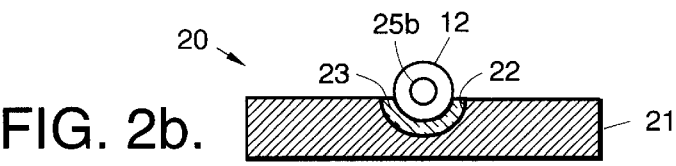
FIG. 2b.
FIG. 3a.
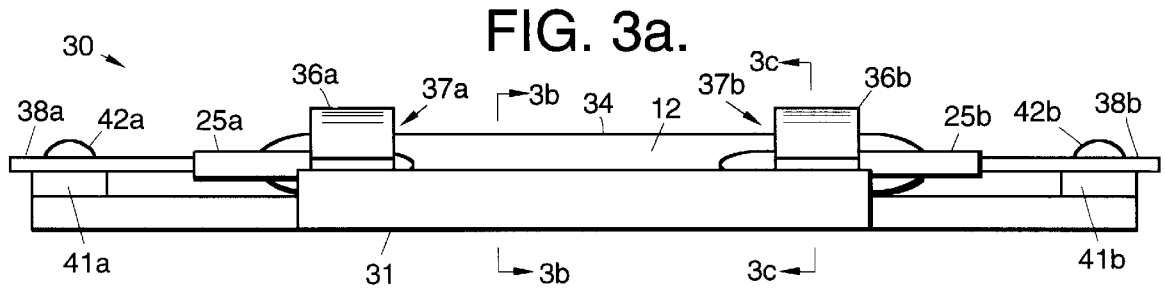
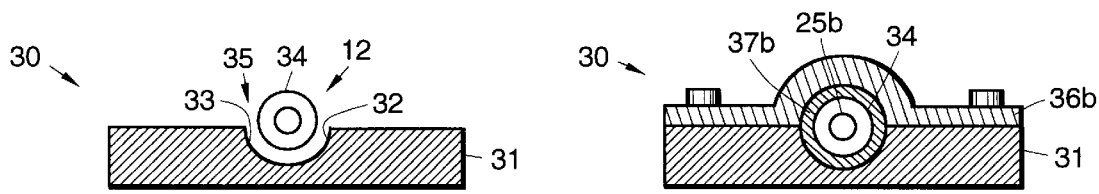
FIG. 3b.
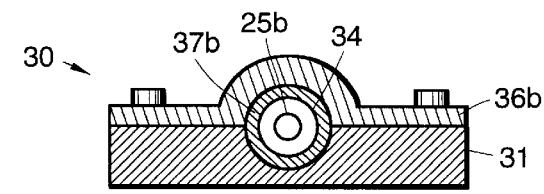
FIG. 3c.

LASER HEAD HAVING A CONDUCTIVELY COOLED FLASHLAMP

BACKGROUND

The present invention relates generally to solid state lasers, and more particularly, to an improved conductively cooled flashlamp that is used as an optical pump in a solid state laser, particularly when the laser is operated at a repetition rate of 20 Hz and higher.

The prior art which this invention displaces relates to the cooling techniques used for linear flashlamps that are used as pump sources for solid state lasers in the medium energy range from 0.001 Joule to 1.0 Joule. Most commercial lasers in this energy range use water cooling of the flashlamps were the liquid is in contact with the envelope of the flashlamp. At room temperature (20° C.), pure water may be used as the cooling liquid without problems.

However, for military lasers or other applications where cold storage and operation below freezing (<0° C.) is required, organic additives (antifreeze, methanol and others) are added to the water. These organic additives are disassociated by ultraviolet radiation from the lamp and are subsequently deposited as absorbers on the flashlamp and laser rod, which degrade the efficiency of the laser.

In prior art lasers employing flashlamp cooling, three primary techniques have been used to cool the flashlamps, including liquid cooling, gas cooling, and conductive cooling. Conductive cooling has been achieved by inserting a reflective material that is a poor thermal conductor between the heat sink and the envelope of the flashlamp. This technique limited operation to 50 mJ, at about 2 Hz. High (1000 psi) pressure air cooling techniques developed for laser designators developed by the assignee of the present invention have a complex and relatively high cost, large size laser head. However, the required performance of 150 mJ at 20 Hz is obtained. Liquid cooled lasers, where the flashlamp is immersed in a flowing liquid have the problem of UV disassociation of organic compounds additives at low temperature operation and storage (−32° C.). However, these lasers have a compact size and meet 150 mJ, 20 Hz performance requirements.

Therefore, it is an objective of the present invention to provide for a conductively cooled flashlamp that has a compact size and operates at low temperatures and at relatively high energy levels without the limitations of conventional laser designs.

SUMMARY OF THE INVENTION

To meet the above and other objectives, the present invention is a conductively cooled flashlamp for use with a solid state laser, for example. The conductively cooled flashlamp comprises an elongated heat sink that has a reflective channel formed in a center portion thereof, and a flashlamp tube having an outer envelope disposed in the channel. The respective ends of the flashlamp tube extend beyond the center portion of the channel. Heat conducting gaskets are disposed around respective ends of the envelope which separate the flashlamp tube from the center portion of the heat sink to provide an air gap therebetween.

Clamps contact the gaskets and secure the envelope to the heat sink. Electrodes are disposed at respective distal ends of the flashlamp tube that extend a short distance longitudinally along an axis the tube away from the ends of the tube. Heavy wires are connected to the electrodes and extend longitudinally away from the respective electrodes beyond the ends of the heat sink. Heat conducting, electrically insulating heat sink members are disposed at opposite distal ends of the heat sink, and wire clamps secure the wires to the heat sink members.

The present invention thus employs a combination of three aspects. A precisely made flashlamp envelope comprising a quartz or sapphire tube is disposed in close proximity to a reflectively coated (gold) heat sink, and there is no contact between the flashlamp envelope and the cooling liquid. The envelope near the electrodes where most of the heat is generated are clamped with good thermal contact to the heat sink using an indium gasket thermal interface. The wires that are connected to the flashlamp are connected with thermally conductive and electrically insulating material to the heat sink, such as by using beryllium oxide (BeO) or aluminum nitride (AlN). The present cooling technique eliminates the need for liquid to contact the envelope of the flashlamp. This eliminates UV-caused disassociation of liquid organic additives for low temperature operation. The present invention has lower complexity then alternative high-pressure air flow cooling techniques. In the present invention, ultraviolet radiation does not reach the cooling liquid.

The present invention meets the performance goals of comparable liquid cooled flashlamp designs at a 150 mJ, 20 Hz laser performance level, which requires greater than 200 watts heat removal from the lamp. The present invention is more compact and less costly than high pressure air cooled designs and also eliminates problems with the UV contamination found in prior art liquid-cooled lamp designs. The present invention may be employed in laser designators and laser rangefinders particularly where compact size is required.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1a shows a cross sectional side view of conventional liquid and high pressure air cooled flashlamps;

FIG. 1b illustrates a cross sectional end view of the flashlamp of FIG. 1a taken along the lines 1b—1b;

FIG. 2a shows a cross sectional side view of a conventional conductively cooled flashlamp;

FIG. 2b illustrates a cross sectional end view of the flashlamp of FIG. 2a taken along the lines 2b—2b;

FIG. 3a illustrates a cross sectional side view of a conductively cooled flashlamp in accordance with the principles of the present invention;

FIG. 3b illustrates a cross sectional end view of the flashlamp of FIG. 3a taken along the lines 3b—3b; and FIG. 3c illustrates a cross sectional end view of the flashlamp of FIG. 3a taken along the lines 3c—3c.

DETAILED DESCRIPTION

The present invention provides for a new approach to cooling flashlamps used as optical pumps in solid state lasers, particularly at repetition rates of 20 Hz and higher. These higher repetition rates are typically required for military laser designators and laser rangefinders.

Referring to the drawing figures, FIG. 1a shows a cross sectional side view of conventional liquid and high pressure air cooled flashlamps 10, and FIG. 1b illustrates a cross sectional end view of the flashlamp 10 of FIG. 1a taken along the lines 1b—1b. This conventional flashlamp 10 comprises an outer housing 11 that encloses a flashlamp tube 12 having two electrodes 13a, 13b at its respective ends. A plurality of seals 14 are disposed between an inner periphery of the housing 11 and an outer periphery of the flashlamp tube 12 to provide a sealed housing 11. Input and output cooling ports 15a, 15b are provided through a wall of the housing 11 that permit the flow of a liquid 16, such as water or high pressure cooling air around the flashlamp tube 12 within the sealed housing 11.

The liquid cooling technique is the most efficient and is used in high repetition or CW pumped lasers. Solid state commercial lasers used in material processing, such as in welding and drilling of materials, are examples. In these applications the lasers are not required to operate at temperatures less than 0° C. and thus water ($H_2O$) may be used as the cooling liquid 16.

In military applications, where operation over a wide temperature range is required, organic additives are used for operation below freezing (<0° C.). The UV radiation from the flashlamp 10 disassociates organic compounds in the additives, creating light absorbing deposits on the flashlamp tube 12 and laser rod, which reduces the lifetime and performance of the laser.

To alleviate the problems with the liquid cooled flashlamps 10, a pressurized air cooled flashlamp 10 was developed by the assignee of the present invention that is schematically the same as the water cooled flashlamp depicted in FIGS. 1a and 1b, but uses high pressure air 16 as a cooling agent in place of the liquid 16.

For relatively low pulse repetition rates (3 Hz), a conductively cooled approach may be used that is depicted in FIGS. 2a and 2b. FIG. 2a shows a cross sectional side view of a conventional conductively cooled flashlamp 20, and FIG. 2b illustrates a cross sectional end view of the flashlamp 20 of FIG. 2a taken along the lines 2b—2b. With reference to FIGS. 2a and 2b, the flashlamp 20 is comprised of a heat sink 21 that has a channel 22 formed therein. A layer 23 of powdered barium sulfate is disposed in the channel 22 and a flashlamp tube 12, and more specifically, an outer quartz envelope of the tube 12, is placed in contact with the layer 23 of powdered barium sulfate. The flashlamp tube 12 has two electrodes 25a, 25b at its respective ends. The flashlamp tube 12 is cooled by heat conduction from the envelope 24 of the flashlamp tube 12 through the layer 23 of powdered barium sulfate that contacts the flashlamp tube 12 along its length. The layer 23 of powdered barium sulfate acts as a reflector for light produced by the flashlamp tube 12. However the relatively poor heat conduction properties of the layer 23 of powdered barium sulfate layer limit the operation of the flashlamp 20, and thus the laser in which it is employed, to a repetition rate of 3 Hz.

Referring now to FIG. 3a, it illustrates a cross sectional side view of a conductively cooled flashlamp 30 in accordance with the principles of the present invention. FIG. 3b illustrates a cross sectional end view of the flashlamp 30 of FIG. 3a taken along the lines 3b—3b, while FIG. 3c illustrates a cross sectional end view of the flashlamp 30 of FIG. 3a taken along the lines 3c—3c.

The present conductively cooled flashlamp 30 comprises an elongated heat sink 31 that has a semicircular, cylindrically-shaped channel 32 formed in a center portion thereof. The channel 32 in the center portion of the heat sink 31 is reflective, which may be achieved by coating the surface of the channel 32 with a reflective coating 33 such as gold. A flashlamp tube 12 having an outer quartz envelope 34 is disposed in the cylindrically-shaped channel 32 and its respective ends extend beyond the center portion of the channel 32. The envelope 34 and flashlamp tube 12 do not contact the channel 32 in the center portion of the heat sink 31. An air gap 35 is formed between the channel 32 and the envelope 34 surrounding a flashlamp tube 12. The flashlamp tube 12 is thus separated from the center portion of the heat sink 31.

First and second clamps 36a, 36b, that may comprise aluminum, for example, are disposed at opposite ends of the center portion of the heat sink 31 that are used to secure the flashlamp tube 12 and envelope 34 to the center portion of the heat sink 31. First and second indium gaskets 37a, 37b are disposed around the envelope 34 of the flashlamp tube 12 and between the clamps 36a, 36b and the heat sink 31. Thus, the two clamps 36a, 36b and heat sink 31 are in contact with the indium gaskets 37a, 37b and not in contact with the flashlamp tube 12. The indium gaskets 37a, 37b are thus used to separate the flashlamp tube 12 from the central portion of the heat sink 31.

The flashlamp tube 12 has first and second electrodes 25a, 25b at its respective distal ends that extend a short distance longitudinally along the axis the tube 12 away from the ends of the tube 12. Electrically conductive wires 38a, 38b are connected to the respective electrodes 25a, 25b that extend longitudinally further along the axis the tube 12 away from the respective electrodes 25a, 25b and beyond the distal ends of the heat sink 31. First and second heat conducting, electrically insulating heat sink members 41a, 41b, that may be comprised of beryllium oxide or aluminum nitride material, for example, are disposed at opposite distal ends of the heat sink 31. First and second wire clamps 42a, 42b are respectively used to secure the respective electrically conductive wires 38a, 38b to the heat conducting, electrically insulating heat sink members 41a, 41b.

Thus, in the present flashlamp 30, the quartz envelope 34 is in close proximity to a reflectively coated heat sink 31 and there is no contact with a liquid cooling agent. The envelope 34 near the electrodes 25a, 25b where most of the heat is generated are clamped using the indium gaskets 37a, 37b that provide an efficient thermal interface and good thermal contact to the heat sink 31. The wires 38a, 38b that connect to the electrodes 25a, 25b of the flashlamp are connected to the heat sink 31 using thermally conductive, electrical insulating heat sink members 41a, 41b.

The present conductively cooled flashlamp 30 provides efficient conductive cooling resulting in a low cost, compact laser head. The present invention extends the performance of the conductive cooled flashlamp 12 to permit repetition rates of greater than 20 Hz. Most of the generated heat is concentrated at the electrodes 25a, 25b of the flashlamp 30, and this fact is used to optimize the conductive cooling technique by providing efficient heat transfer at the location of the electrodes 25a, 25b by using relatively heavy wires attached to the electrodes 25a, 25b and coupling the quartz envelope 34 to the heat sink 31 by means of the indium gaskets 37a, 37b.

In a reduced to practice embodiment of the flashlamp 30, the quartz envelope 34 near each electrode 25a, 25b is clamped using aluminum clamps 42a, 42b and indium gaskets 37a, 37b that provide good thermal contact between the quartz envelope 34 and the heat sink 31. Heavy copper wire 38a, 38b is attached with solder to the beryllium oxide or aluminum nitride electrically insulating thermally conducting heat sink members 41a, 41b, facilitating heat removal from the copper wire 38a, 38b. Also, the close proximity of the quartz envelope 34 of the flashlamp 30 to the highly reflective, highly heat conductive reflector provided by the surface of the heat sink 31 adjacent the flashlamp tube 12, forms the small trapped air gap 35 having relatively good heat transfer properties. This air gap 35 provides room for expansion of the flashlamp 30 relative to the heat sink 31 caused by the differential thermal expansion thereof.

The present invention was reduced to practice by building a laser head using the conductive cooling flashlamp techniques described herein. The desired performance of 150 mJ of energy at a 20 Hz repetition rate and less than 1.5 milliradian beam divergence was obtained with an 11.6 Joule input (232 watts) to the flashlamp. The laser head was operated for more than one half million pulses without performance degradation. Visual inspection of the flashlamp 30 did not show any sputtering of electrode material on to the envelope 34 of the flashlamp 30, indicating a potential flashlamp life of greater than 1 million pulses, which is comparable to other cooling techniques.

Thus, an improved conductively cooled flashlamp that is used as an optical pump in a solid state laser has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A conductively cooled flashlamp (30) characterized by:
   an elongated heat sink that has a reflective channel (32) formed in a center portion thereof;
   a flashlamp tube (12) having an outer envelope (34) disposed in the channel (32) and having its respective ends extending beyond the center portion of the channel (32);
   first and second heat conducting gaskets (37a, 37b) disposed around respective ends of the envelope (34) of the flashlamp tube (12), and which separate the flashlamp tube (12) from the center portion of the heat sink (31) to provide an air gap (35) therebetween;
   first and second clamps (36a, 36b) that contact the gaskets (37a, 37b) to secure the envelope (34) of the flashlamp tube (12) to the heat sink (31);
   first and second electrodes (25a, 25b) disposed at respective distal ends of the flashlamp tube (12) that extend a short distance longitudinally along an axis the tube (12) away from the ends of the tube (12);
   electrically conductive wires 38a, 38b connected to the respective electrodes (25a, 25b) that extend longitudinally further along the axis the tube (12) away from the respective electrodes (25a, 25b) and beyond the distal ends of the heat sink (31);
   first and second heat conducting, electrically insulating heat sink members (41a, 41b) disposed at opposite distal ends of the heat sink (31); and
   first and second wire clamps 42a, 42b for securing the respective wires 38a, 38b to the heat conducting, electrically insulating heat sink members (41a, 41b).

2. The flashlamp (30) of claim 1 wherein the elongated heat sink (31) has an elongated semicircular, cylindrically-shaped channel (32) formed in the center portion thereof.

3. The flashlamp (30) of claim 1 wherein the flashlamp tube (12) has an outer quartz envelope (34).

4. The flashlamp (30) of claim 1 wherein the reflective channel (32) is characterized by a reflective coating disposed on a surface of the channel (32).

5. The flashlamp (30) of claim 1 wherein the reflective coating is characterized by gold.

6. The flashlamp (30) of claim 1 wherein the first and second heat conducting gaskets are characterized by indium.

7. The flashlamp (30) of claim 1 wherein the first and second clamps (36a, 36b) are characterized by aluminum.

8. The flashlamp (30) of claim 1 wherein the gaskets (37a, 37b) are characterized by indium.

9. The flashlamp (30) of claim 1 wherein the first and second heat conducting, electrically insulating heat sink members (41a, 41b) are characterized by aluminum nitride.

10. The flashlamp (30) of claim 1 wherein the first and second heat conducting, electrically insulating heat sink members (41a, 41b) are characterized by beryllium oxide.

11. The flashlamp (30) of claim 1 wherein the electrically conductive wires 38a, 38b are characterized by heavy copper wire.

12. A conductively cooled flashlamp comprising:
    a heat sink having a reflective channel formed in a portion thereof;
    a flashlamp tube having an outer envelope disposed in the channel and having an end extending beyond the channel;
    a heat conducting gasket disposed proximate the end of the envelope of the flashlamp tube, for separating the flashlamp tube from the center portion of the heat sink to provide an air gap therebetween;
    an electrode proximate the end of the flashlamp tube that extends a short distance away from the end of the tube;
    an electrically conductive wire connected to the electrode that extends further away from the electrode and beyond the end of the heat sink; and
    a heat conducting, electrically insulating heat sink member disposed at an end of the heat sink.

13. The flashlamp of claim 12 further comprising a wire clamp for securing the wire to the heat conducting, electrically insulating heat sink member.

14. The flashlamp of claim 12 wherein the flashlamp tube is elongated along an axis, wherein the electrode is disposed at an end of the flashlamp tube that extends a short distance longitudinally along an axis of the tube away from the end of the tube and wherein the electrically conductive wire connected to the electrode extends longitudinally further along the axis of the tube away from the electrode and beyond an end of the heat sink.

15. The flashlamp of claim 12 further comprising a heat conducting clamp that contacts the gasket to secure the envelope of the flashlamp tube to the heat sink.

16. The flashlamp of claim 12 wherein the flashlamp tube has an outer quartz envelope.

17. The flashlamp of claim 12 wherein the reflective channel is characterized by a reflective coating disposed on a surface of the channel.

18. The flashlamp of claim 12 wherein the heat conducting gasket is characterized by indium.

19. The flashlamp of claim 12 wherein the heat sink member is characterized by one or more of either aluminum nitride or beryllium oxide.

20. The flashlamp of claim 12 wherein the electrically conductive wire is characterized by heavy copper wire.

* * * * *